United States Patent [19]

Tokugawa

[11] Patent Number: 4,909,541
[45] Date of Patent: Mar. 20, 1990

[54] ADJUSTABLE SHOULDER ANCHOR MECHANISM

[75] Inventor: Osamu Tokugawa, Fujisawa, Japan

[73] Assignee: Nippon Seiko Kabushiki Kaisha, Tokyo, Japan

[21] Appl. No.: 263,647

[22] Filed: Oct. 27, 1988

[30] Foreign Application Priority Data

Nov. 6, 1987 [JP] Japan .............. 62-169698[U]
Mar. 9, 1988 [JP] Japan .............. 63-30404[U]

[51] Int. Cl.$^4$ .............................................. B60R 22/00
[52] U.S. Cl. ..................................... 280/808; 280/801
[58] Field of Search .............................. 280/808, 801

[56] References Cited

U.S. PATENT DOCUMENTS 4,508,363 4/1985 Temple ................................ 280/808

FOREIGN PATENT DOCUMENTS 133572 2/1985 European Pat. Off. ............ 280/808
8709069 9/1987 Fed. Rep. of Germany .
2176091 12/1987 United Kingdom .

Primary Examiner—Kenneth R. Rice
Attorney, Agent, or Firm—Hedman, Gibson, Costigan & Hoare

[57] ABSTRACT

An adjustable shoulder anchor mechanism for use in a vehicle chassis having an engaging hole comprises as elongated adjustment base having a plurality of engaging sections arranged in the longitudinal direction thereof, an adjustable anchor adapted to be guided along the adjustment base, and the adjustment base formed at one end thereof with a hook section, the hook section adapted to be inserted into the engaging hole and moved to come into engagement with the vehicle chassis on an peripheral portion of the engaging hole.

23 Claims, 6 Drawing Sheets

FIG.3
FIG.4
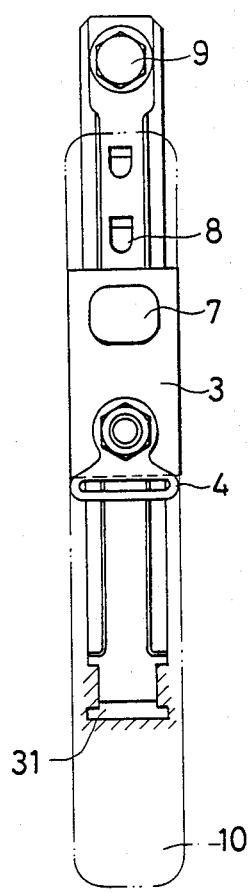
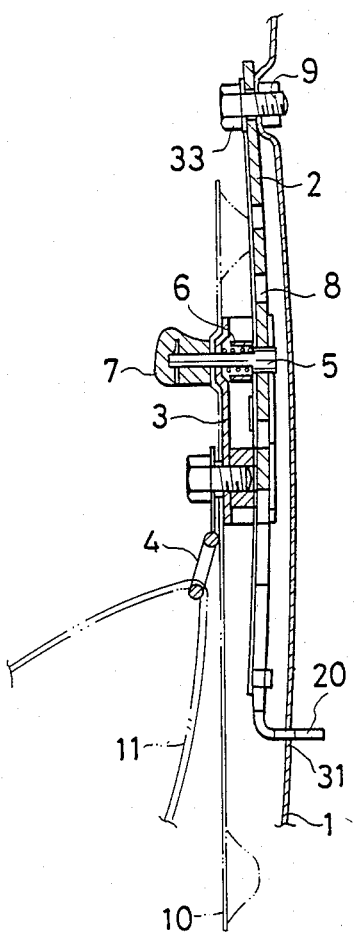

4,909,541

ADJUSTABLE SHOULDER ANCHOR MECHANISM

FIELD OF THE INVENTION

The present invention relates to an adjustable shoulder anchor mechanism for mounting on an automobile or the like wherein adjustment of the height of the shoulder section of the seat belt is possible.

BACKGROUND OF THE INVENTION

In the conventional seat belt device for a vehicle which is provided on an automobile or the like, in order to install the seat belts at the shoulders of the occupants of the vehicle correctly suitable at positions for the physique and the sitting height of those occupants, an adjustable shoulder anchor mechanism is provided which engages to fasten, at a vertically adjustable mounting position, an adjustable anchor connected to a joint which supports a webbing. In particular, a widely used type is one with a unit which uses a continuous webbing for both shoulders and laps, in which a slip joint which passes through and supports the middle section of the webbing is connected to the adjustable anchor, making is possible to adjust the vertical mounting position.

An explanation will now be given with reference to FIG. 1 and FIG. 2 which show, respectively, a front elevational view and a cross-sectional view of a conventional example of this type of adjustable shoulder anchor. Shown in these drawings are an adjustment base or guiding member 2 which is installed by means of upper and lower bolts 9 on a chassis 1 of a vehicle. An adjustable anchor or runner 3 is connected to a slip joint 4 which is penetrated by a webbing 11. The adjustable anchor or runner 3 is guided so as to be moved in the vertical direction on the adjustment base 2. Provided on the adjustable anchor 3 is a movable lock pin 5 which can engage a plurality of engaging openings 8 which are provided through the adjustment base 2. The lock pin 5 is energized in the direction orthogonal to the chassis 1 by means of a spring 6 and is thus maintained in engagement with one of the engaging openings 8. The lock pin 5 can be pulled out by means of a knob 7 which is mounted on the side opposite from the chassis 1, so that the engagement is cancelled.

Accordingly, when it is desired to change the height or position of the slip joint 4 which is penetrated by the webbing 11, the knob 7 is drawn toward the inside of the vehicle and the lock pin 5 is withdrawn from the engaging opening 8. The adjustable anchor 3 is therefore caused to move vertically along the adjustment base 2. At a position corresponding to a suitable engaging opening 8, the knob 7 may be released, allowing the lock pin 5 to penetratingly engage the engaging opening 8 by means of the force of the spring 6.

However, in the above conventional example, the adjustment base is mounted by means of the bolts 9 to the chassis 1 of the vehicle, so that when this mounting is performed, the positioning is troublesome and time is required to tighten the bolts 9.

In another conventional example, a bolt tightening section is provided in the middle section of the adjustment base. Because this bolt tightening section is within the path of movement of the adjustable anchor, there is the inconvenience that the adjustable anchor must be secured after moving it to the top or bottom edges. There is also the inconvenience that this produces limitations in the design, inasmuch as the shape of the anchor base and the bolts must be determined so as not to hamper the movement of the adjustable anchor.

SUMMARY OF THE INVENTION

An object of the present invention is to provide, with due consideration to the drawbacks of such conventional devices, as adjustable shoulder anchor mechanism which can be mounted on a vehicle chassis in a simple manner.

Another object of the pressent invention is to provide an adjustable shoulder anchor mechanism which can reduce the number of the coupling means such as a screw and the like.

Another object of the pressent invention is to provide an adjustable shoulder anchor mechanism which makes it possible to secure a hook section to an engaging hole on the chassis of the vehicle by simply pulling it directly, so that the adjustable shoulder anchor mechanism can be installed with extreme ease and in a very short time and also has a very simple structure.

This object is accomplished in the present invention by the provision of an adjustable shoulder anchor mechanism to be mounted to an engaging hole of a vehicle chassis, comprising an elongated adjustment base or guiding member having a plurality of female engaging sections or openings arranged in the longitudinal direction, an adjustable anchor or runner adapted to be guided along the adjustment base, a joint connected to the adjustable anchor to support a webbing, and a lock pin provided in the adjustable anchor and adapted to come into engagement with one of the engaging sections or openings, the adjustment base formed at one end thereof with a hook section, and at the other end thereof a positioning opening, and the hook section adapted to be inserted into the engaging hole of the vehicle chassis and moved to come into engagement with the vehicle chassis along the peripheral portion of the engaging hole for securely mounting the adjustable shoulder anchor mechanism to the vehicle chassis.

An additional object of the present invention is to provide a means of preventing interference noise caused by a change in the dimensions of the engaging hole on the chassis and/or a variation in the dimensions of the adjustable anchor and the adjustment base so that a clearance is produced between the adjustment base and the room side surface of the vehicle chassis in the case where the adjustment base slips downward.

This object is accomplished in the present invention by the provision of a projecting section on the hook section of the adjustment base which prevents the creation of interference noise between the adjustment base and the chassis of the vehicle.

BRIEF DESCRIPTION OF THE DRAWINGS

These and other objects, features and advantages of the present invention will become more apparent from the following description of the preferred embodiments taken in conjunction with the accompanying drawings, in which:

FIG. 3 is a front elevational view of a first embodiment of the present invention.

FIG. 4 is a cross-sectional view of the first embodiment.

DETAILED DESCRIPTION OF THE PREFERRED EMBODIMENTS

Figure 1:
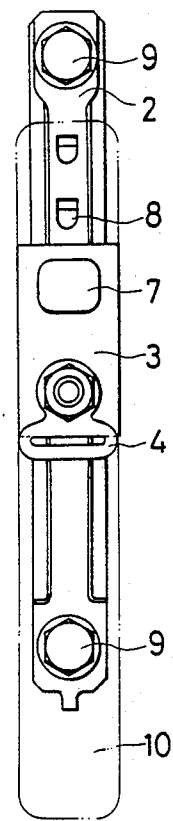
FIG. 1 is a front elevational view showing an example of a conventional adjustable shoulder anchor mechanism.
Figure 2:
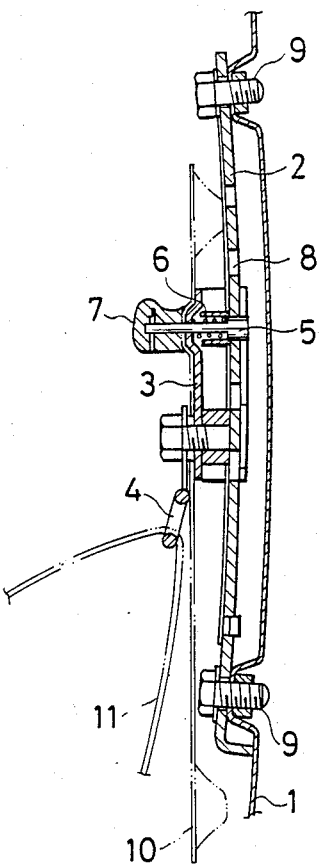
FIG. 2 is a cross-sectional view of the example of the FIG. 1.
Figure 5A:
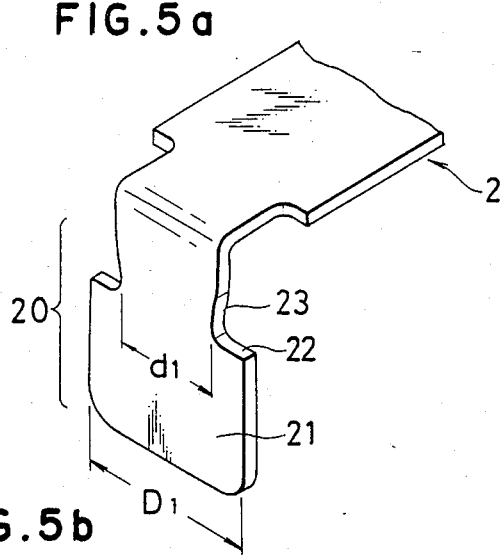
FIG. 5a is a perspective view showing the hook section of the first embodiment of the present invention.

Now referring to the attached drawings, in which like members are indicated by like reference numerals throughout the drawings, in FIG. 3, FIG. 4, and FIG. 5a, an adjustable shoulder anchor mechanism of the present invention is mounted onto a vehicle chassis 1 and comprised of an adjustment base or guiding member 2, an adjustable anchor or runner 3, a slip joint 4, a movable lock pin 5, a spring 6 and a knob 7. The adjustment base 2 is formed with a plurality of engaging sections or openings 8. These elements are substantially the same as those of the conventional example of FIG. 1, and their detailed description is omitted.

In this embodiment, the adjustment base or guiding member 2 is adapted to be secured at one end thereof with a bolt 9 to the chassis 1 at a positioning hole 33 thereof and provided with a hook section 20 at the other end thereof, while an engaging hole 31 is formed in the chassis 1, so that the hook section 20 is inserted into the engaging hole 31 and can be moved into an engagement relationship with the chassis 1. The adjustment base 2 is then secured at the one end thereof to the chassis 1 by the bolt 9 inserted through the positioning hole 33 to maintain an engaged and secured status.

The hook section 20 is bent at right angles toward the chassis and has an enlarged section 21 with a width $D_1$ provided at the tip of the hook section 20 and having a pair of stepped sections 22 which are constricted from the enlarged section 21. The hook section 20 further has a tapered section 23 with a minimum width $d_1$ which expands in the direction of the adjustment base 2 from the stepped sections 22.

An engaging hole 31 in the chassis 1 is provided with a first elongated hole 31a with a width $D_2$ into which the enlarged section 21 of the hook section 20 can be inserted, and a second trapezpoidal opening 31b with a width $d_2$ is formed with its lower edge in common with the elongated opening 31a.

Figure 5B:
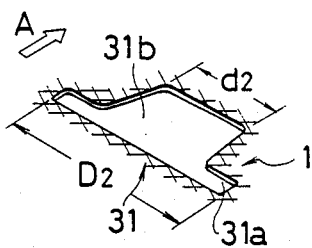
FIG. 5b is a perspective view of the female engaging section or hole into which the hook section of the first embodiment is to be inserted.

The width $D_2$ of the elongated opening 31a as shown in FIG. 5b is slightly larger than the width $D_1$ of the enlarged section 21, and the width $d_2$ of the upper edge of the trapezoidal opening is slightly smaller than the minimum width $d_1$ of the tapered section 23 between the stepped sections 22.

In the engaging action, the hook section 20 of the adjustment base 2 is inserted into the first elongated opening 31a of the engaging hole 31 of the chassis 1 from the upper side, and is caused to move into the second trapezoidal opening 31b (in the direction of the arrow A in FIG. 5b) after the enlarged section 21 is completely projected from the elongated opening 31a into the opposite side of the chassis 1. While the tapered edge surfaces of the chassis 1 at the trapezoidal opening 31b and the tapered section 23 of the hook section 20 are rubbing together, the part which has the smallest $d_1$ of the tapered section 23 comes into engagement with the trapezoidal opening 31b, whereby the installation operation of the one end of the adjustment base 2 is completed.

The bolt 9 is then inserted at the other end of the adjustment base 2 into the positioning hole 33 and tightened, so that the adjustment base 2 is secured to the chassis 1 and maintained in an engaged and secured status.

The means of securing the adjustment base or guiding member 2 to the chassis 1 at the positioning hole 33 is not limited to the bolt 9. Any type of securing means which will maintain the engaged and secured status of the adjustment base 2 and the chassis 1 can be used.

Figure 6A:
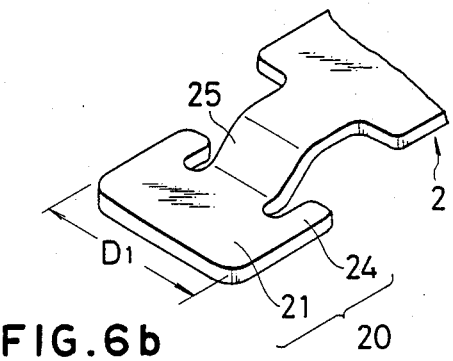
FIG. 6a is a perspective view showing the hook section of a second embodiment of the present invention.

FIG. 6a is a perspective view showing the hook section 20 of a second embodiment of the present invention. The hook section 20 of the adjustment base 2 has an enlarged section 21 at its tip. At both ends of the enlarged section 21 with a width $D_1$, a pair of arms 24 continuing straight from the enlarged section 21 are formed, and a tapered section 25 is formed between the arms 24 and raised from the enlarged section 21 at an angle with the arms 24. Furthermore the tapered section 25 is connected to the adjustment base 2 to keep the enlarged section 21 almost parallel to the adjustment base 2. It will be noted that a gap is provided between the end of the tapered section 25 and the arms 24 for interlocking with the chassis 1.

Figure 6B:
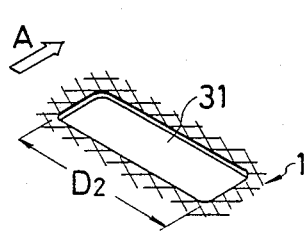
FIG. 6b is a perspective view of the female engaging section or hole into which the hook section of the second embodiment is to be inserted.

The chassis 1 in FIG. 6b is formed with an engaging hole 31 in a rectangular shape with a width $D_2$ which is slightly larger than the width $D_1$ of the enlarged section 21, so that it is possible to insert the enlarged section 21 of the hook section 20 into the engaging hole 31.

The enlarged section 21 of the hook section 20 is first inserted perpendicularly into the engaging hole 31 in the chassis 1. Then when the tapered section 25 is entering the engaging hole 31, the adjustment base or guiding member 2 and the hook section 20 are simultaneously rotated to the top side of the chassis 1, so that the arms 24 of the hook section 20 protrude into the opposite side of the chassis 1. On moving it in the direction of the arrow A in FIG. 6b, one edge of the chassis 1 on the periphery of the engaging hole 31 is interlocked and maintained in the gap between the arms 24 and the tapered section 25.

Figure 7A:
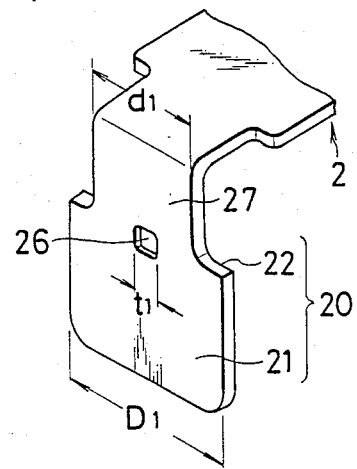
FIG. 7a is a perspective view showing the hook section of a third embodiment of the present invention.

FIG. 7a is a perspective view showing the hook section 20 of a third embodiment of the present invention. The hook section 20 has an enlarged section 21 with a width $D_1$ containing a pair of stepped sections 22 and an opening 26 between the stepped sections 22. A reduced section 27 with a width $d_1$ perpendicular to the adjustment base 2 is formed between the adjustment base 2 and the enlarged section 21 and connected through the stepped sections 22 straight to the enlarged section 21, so that the opening 26 with a width $t_1$ is formed almost level with the stepped sections 22.

Figure 7B:
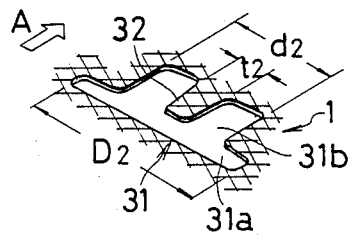
FIG. 7b is a perspective view of the female engaging section or hole into which the hook section of the third embodiment is to be inserted.

The engaging hole 31 of the chassis 1 as shown in FIG. 7b had a first elongated opening 31a with a width $D_2$ which is slightly larger than the width $D_1$ of the enlarged section 21 of the hook section 20, and also has a second rectangular opening 31b with a width $d_2$ which is almost identical to the width $d_1$ of the reduced section. The second rectangular opening 31b is continuous to the elongated opening 31a. A projection 32 with a taper protrudes into the rectangular opening 31b at the top center thereof. The width $t_2$ of the base of the projection 32 is slightly larger than the width $t_1$ of the opening 26 in the hook section 20.

In the engaging action, in the same way as in the first embodiment, the enlarged section 21 is inserted into the elongated opening 31a, so that the enlarged section 21 projects completely into the opposite side of the chassis 1. At the time when the projection 32 is adjusted in the opening 26, the enlarged section 21 is moved in the direction of the arrow A in FIG. 7b, and the operation is completed by firmly engaging the projection 32 in the opening 26.

Figure 8A:
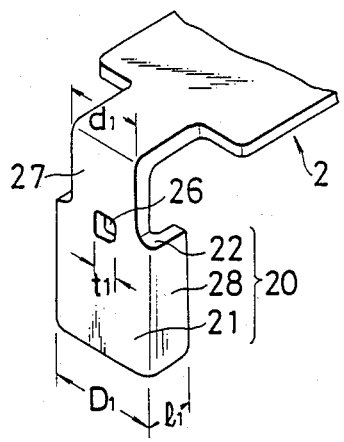
FIG. 8a is a perspective view showing the hook section of a fourth embodiment of the present invention.

FIG. 8a is a perspective view showing the hook section 20 of a fourth embodiment of the present invention. It is almost identical to the third embodiment shown in FIG. 5a, but is made more compact. The hook section 20 has an enlarged section 21 with a width $D_1$ bent at both ends toward the center of the adjustment base 2 to provide a pair of arms 28. The hook section 20 is connected to the adjustment base 2 through a reduced section 27 with a width $d_1$, and provided with a pair of stepped sections 22 at the side adjacent the reduced section 27. An opening 26 a width $t_1$ is provided between the stepped sections 22 and almost level with the stepped sections 22.

Figure 8B:
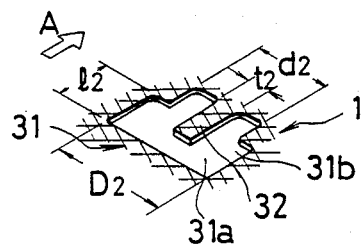
FIG. 8b is a perspective view of the female engaging section or hole into which the hook section of the fourth embodiment is to be inserted.

The engaging hole 31 of the chassis 1 in FIG. 8b comprises a first rectangular opening 31a with a longer width $D_2$ which is slightly larger than the width $D_1$ of the enlarged section 21 and a shorter width $l_2$ which is slightly greater than the extension $l_1$ of the arms 28, and a second rectangular opening 31b continued to the rectangular opening 31a which has a width $d_2$ almost identical to the width $d_1$ of the reduced section 27. A projection 32 having a width $t_2$ almost identical to the width $t_1$ of the opening 26 extends from the top edge of the small second rectangular opening 31b into the larger first rectangular opening 31a.

The hook section 20 of the adjustment base or guiding member 2 is inserted into the larger first rectangular opening 31a, so that the enlarged section 21 penetrates to the opposite side of the chassis 1. When the projection 32 is adjusted in the opening 26, the adjustment 2 is moved in the direction of the arrow A in FIG. 8b, so that the projection 32 extends deeply into the opening 26, whereby the engaging operation is completed.

Figure 9A:
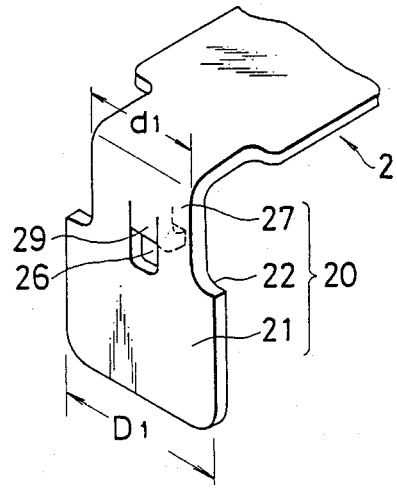
FIG. 9a is a perspective view showing the hook section of a fifth embodiment of the present invention.

FIG. 9a is a perspective view showing the hook section 20 of the fifth embodiment of the present invention, which comprises an enlarged section 21 with a width $D_1$ and a reduced section 27 with a width $d_1$ connected between a pair of stepped sections 22 to the enlarged section 21. Formed in line with the stepped sections 22 of the enlarged section 21 at its almost horizontal center section is a cutout 26 and a tongue leaf 29 which is folded to the center side of the adjustment base 2.

Figure 9B:
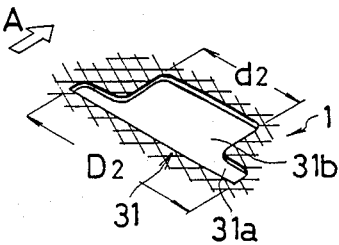
FIG. 9b is a perspective view of the female engaging section or hole into which the hook section of the fifth embodiment is to be inserted.

In the engaging operation, the enlarged section 21 is inserted into a first elongated opening 31a of the engaging hole 31 having a width $D_2$ which is slightly larger than the width $D_1$ of the enlarged section 21. When the enlarged section 21 penetrates to the opposite side of the chassis 1, the adjustment base 2 is moved in the direction of the arrow A in FIG. 9b, and when the tongue leaf 29 contacts the edge of a second opening 31b of the engaging hole 31, it is further pressed in the A direction, such that one edge of the chassis 1 on the periphery of the engaging hole 31 is inserted between and supported by the stepped sections 22 and the tongue leaf section 29, whereby the hook section 20 contacts the top edge of the engaging hole 31 to complete the operation.

In this case, in the same way as in the third and fourth embodiments, a projection can be provided on the side of the chassis 1, specifically of the second opening 31b and engaged in the cutout 26.

In addition, in the third and fourth embodiments, by adjusting the position of the opening 26, it is possible for the chassis 1 to be interposed and maintained between the stepped sections 22 and the edges of the opening 26.

Figure 10:
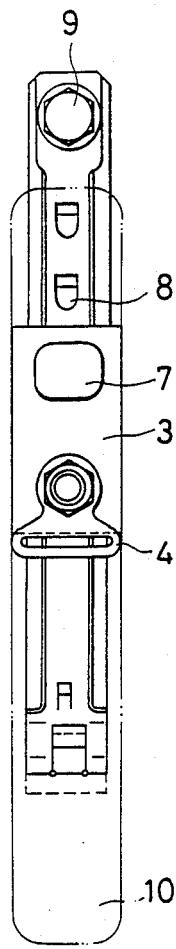
FIG. 10 is a front elevational view of a sixth embodiment of the present invention.
Figure 11:
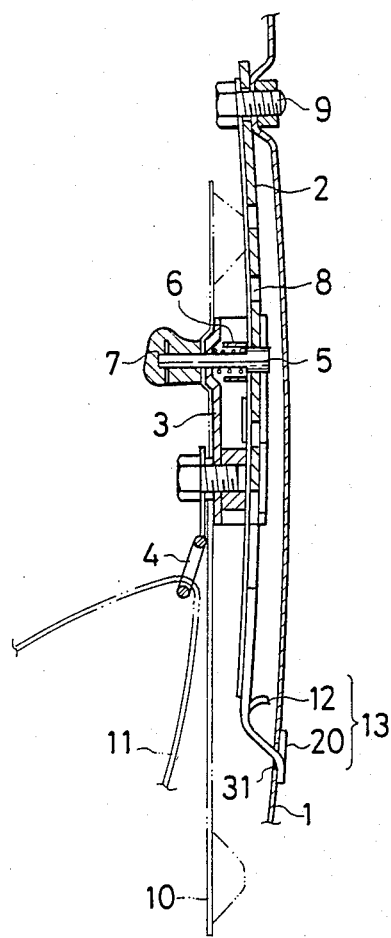
FIG. 11 is a cross-sectional view of the sixth embodiment of the present invention.

FIG. 10 is a front elevational view of a sixth embodiment of the present invention and FIG. 11 is a cross-sectional view of the same embodiment.

Figure 12A:
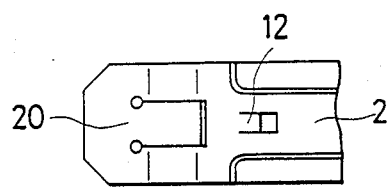
FIG. 12a is a front elevational view of the male engaging section of the sixth embodiment of the present invention.
Figure 12B:
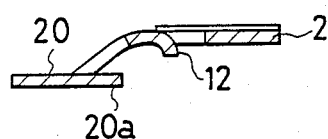
FIG. 12b is a cross-sectional view of the male engaging section of the sixth embodiment.

Provided on one end of the adjustment base or guiding member 2 is a male engaging section 13 which comprises a hook section 20 and a projection 12 provided close to the hook section 20. As illustrated in FIGS. 12a and 12b, the hook section 20 is made in such a manner that a cutout is formed at the end of the adjustment base 2 to form a tongue section 20a which is turned up, and the tongue section 20a is shaped parallel to the center section of the adjustment base 2. The projection 12 is formed by cutting out the center section of the adjustment base 2 at an edge portion thereof, such that the projection 12 is projected in substantially the same direction as the tongue section 20a.

The hook section 20 of the male engaging section 13 is inserted into an engaging hole 31 in the chassis 1, so that it contacts the back surface of the chassis 1 at the tongue section 20a and the projection 12 contacts the front or room side of the chassis 1. The chassis 1, specifically the edge of the engaging hole 31 is thus flexibly interposed between the hook section 20 and the projection 12. Even if the male engaging section 13 shifts downward resulting in that a clearance is formed between this male engaging section 13 and the chassis 1, since the chassis 1 is interposed between the tongue section 20a and the projection 12, the adjustment base 2 cannot slip in the direction of the thickness of the chassis 1. Accordingly, the male engaging section 13 cannot separate from the chassis 1 whereby the creation of interference noise can be prevented.

Figure 13A:
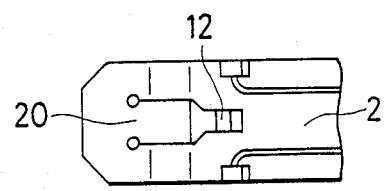
FIG. 13a is a front elevational view of the male engaging section of a seventh embodiment of the present invention.
Figure 13B:
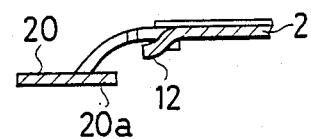
FIG. 13b is a cross-sectional view of the male engaging section of the seventh embodiment

FIGS. 13a and 13b show details of the male engaging section of a seventh embodiment of the present invention. The center section of the adjustment base or guiding member 2 and the hook secton 20 are formed with a cutout to form a projection 12 and a tongue section 20a, respectively, and the cutouts are connected with each other to form a single opening. Therefore, the projection 12 is projected from the center section of the adjustment base 2 toward the hook section 20.

Figure 14A:
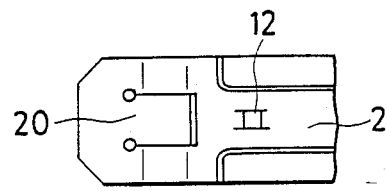
FIG. 14a is a front elevational view of the male engaging section of an eighth embodiment of the present invention.
Figure 14B:
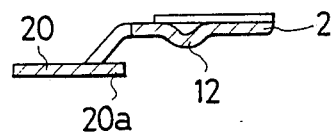
FIG. 14b is a cross-sectional view of the male engaging section of an eighth embodiment of the present invention.

FIGS. 14a and 14b show details of the male engaging section of an eighth embodiment of the present invention. The projection 12 is formed by providing a pair of parallel cuts with the section between the cuts remained at both ends in connection with the adjustment base 2, and the portion between the cuts is bent to form a projection 12 like a wrinkle.

In the seventh and eighth embodiments of the present invention, the chassis 1, specifically the edge of the engaging hole 31 is interposed between the hook section 20 and the projection 12 as in the same manner as in the sixth embodiment.

In the first to eighth embodiments of the present invention, the case is shown where the hook section 20 is provided on the bottom side of the adjustment base or guiding member 2. However, it is also possible to provide the hook section 20 on the top side of the adjustment base 2.

As outlined above, by means of the present invention, it is possible, without using a coupling means such as a screw and the like, to secure one end of the adjustment base or guiding member by simply inserting the hook section of the adjustment base into the engaging hole of the chassis of the vehicle and causing it to move, which is extremely simple in comparison with conventional devices. Therefore the adjustment base can be installed in a very short time, which can greatly improve productivity. In addition, because it is not necessary to position a bolt or similar connecting device within the path of movement of the adjustable anchor, the vehicle production process is simplified.

Further, by providing a projecting projected from the adjustment base toward the chassis side in contact with the chassis, the play between the adjustment base and the chassis is eliminated without adding particular parts, so that it is possible to prevent abnormal noise generation.

What is claimed is:

1. An adjustable shoulder belt anchor mechanism for use in a vehicle chassis having an engaging hole comprising:
    an elongated adjustment base;
    an adjustable anchor adapted to be guided along the adjustment base;
    a joint connected to the adjustable anchor to support a webbing belt;
    a hook section at one end of the adjustment base adapted to be inserted into the engaging hole wherein either the engaging hole or the hook section has a tapering width and the engaging hole and the hook section may be moved with respect to each other in the direction of the tapering width to engage the vehicle chassis.

2. The adjustable shoulder belt anchor mechanism of claim 1, wherein both the engagement hole and hook section comprise a tapered section for mutual engagement.

3. The adjustable shoulder belt anchor mechanism of claim 1, wherein the hook section comprises an opening and the vehicle chassis comprises a projection into the engaging hole for engaging the opening.

4. The adjustable shoulder belt anchor mechanism of claim 1, wherein the engaging hole comprises an elongated opening and a smaller rectangular opening.

5. The adjustable belt anchor mechanism of claim 3, wherein the engaging hole comprises an elongated opening and a smaller rectangular opening and the projection is projected into the rectangular opening.

6. The adjustable shoulder belt anchor mechanism of claim 1, wherein the vehicle chassis has a plate thickness surrounding the engaging hole and the hook section defines a gap between the hook section and the adjustment base which is slightly larger than the plate thickness for engaging the vehicle chassis.

7. The adjustable shoulder belt anchor mechanism of claim 1, wherein the adjustment base can exert a pinching force against the edge of the vehicle chassis across the plate thickness of the vehicle chassis.

8. The adjustable shoulder belt anchor mechanism of claim 1, wherein a projecting section is provided on the hook section for engaging the chassis to prevent interference noise between the adjustment base and the chassis.

9. The adjustable shoulder belt anchor mechansim of claim 8, wherein the hook section has a tongue section, for pinching the chassis between the tongue section and the projecting section.

10. The adjustable shoulder belt anchor mechanism of claim 8, wherein the projecting section is formed by a cutout from the adjustment base.

11. The adjustable shoulder belt anchor mechanism of claim 1, wherein the hook section has an interlocking means to hold an edge of the vehicle chassis on a peripheral portion of the engaging hole.

12. The adjustable shoulder belt anchor mechanism of claim 11, wherein the interlocking means comprises a projection extending from the chassis of the vehicle into the engaging hole and wherein the hook section comprises an opening for engaging the projection.

13. The adjustable anchor mechanism of claim 1, wherein the hook section comprises a pair of arms and an offset raised tapered section between the arms.

14. The adjustable shoulder anchor mechanism of claim 13, wherein the engaging hole is a single rectangular opening.

15. The adjustable shoulder belt anchor mechanism of claim 1, wherein the hook section extends substantially perpendicular to the chassis and has an enlarged section provided at its end, a pair of stepped sections which extend laterally from the enlarged section, and a tapered section between the stepped sections and the adjustment base which tapers as it extends away from the adjustment base and wherein the engaging hole in the chassis has a first elongated opening into which the enlarged section of the hook section can be inserted, and a second tapering opening having its broadest edge in common with an elongated edge of the elongated opening.

16. The adjustable shoulder belt anchor mechanism of claims 1, wherein the hook section is bent toward the chassis and has a laterally enlarged section at its end substantially parallel to the adjustment base, the hook section having a pair of arms extending from the lateral ends of the enlarged section, and a tapered section extending at an angle with respect to the arms connecting the arms and the adjustment base.

17. The adjustable shoulder belt anchor mechanism of claim 1, wherein the hook section is bent toward the chassis and has an enlarged section provided at its end, the enlarged section having a pair of spaced apart stepped sections and the hook section having a reduced section substantially perpendicular to the adjustment base connecting the adjustment base and the enlarged section between the stepped sections.

18. The adjustable shoulder anchor mechanism of claim 1, wherein the engaging hole of the chassis has a first elongated opening which is wider than the widest part of the hook section, and a second contiguous tapered opening which is almost identical in width to the tapered section.

19. The adjustable shoulder belt anchor mechanism of claim 1, wherein the hook section has an opening, and a tapered projection extends from the chassis into the engaging hole for engaging the opening, the projection having a base slightly larger than the opening in the hook section.

20. The adjustable shoulder belt anchor mechanism of claim 1, wherein the hook section has an enlarged section extending parallel to but spaced apart from the adjustment base to define a pair of arms, the arms being connected to the adjustment base through a reduced section, the arms thereby defining a pair of stepped sections adjacent the reduced section.

21. The adjustable shoulder belt anchor mechanism of claim 20, wherein the hook section has an opening provided between the stepped sections, and the chassis has a projection extending into the engaging hole to engage the opening.

22. The adjustable shoulder anchor mechanism of claim 1, wherein the hook section comprises an enlarged section, a reduced section connected to the enlarged section to define a pair of stepped sections, and a tongue leaf which is formed by a cutout folded toward the adjustment base.

23. The adjustable shoulder belt anchor mechanism of claim 22, wherein the chassis is pinched between the tongue leaf and the stepped sections proximate the engaging hole.

* * * * *